US011163873B2

United States Patent
Cervantez

(10) Patent No.: US 11,163,873 B2
(45) Date of Patent: Nov. 2, 2021

(54) DISTRIBUTED SECURITY INTROSPECTION

(71) Applicant: Salesforce.com, Inc., San Francisco, CA (US)

(72) Inventor: Michael Cervantez, San Francisco, CA (US)

(73) Assignee: salesforce.com, Inc., San Francisco, CA (US)

( * ) Notice: Subject to any disclaimer, the term of this patent is extended or adjusted under 35 U.S.C. 154(b) by 307 days.

(21) Appl. No.: 16/193,816

(22) Filed: Nov. 16, 2018

(65) Prior Publication Data

US 2020/0159912 A1 May 21, 2020

(51) Int. Cl.
*G06F 21/00* (2013.01)
*G06F 21/53* (2013.01)
*G06F 21/55* (2013.01)
*G06F 21/56* (2013.01)

(52) U.S. Cl.
CPC .......... *G06F 21/53* (2013.01); *G06F 21/554* (2013.01); *G06F 21/566* (2013.01); *G06F 2221/033* (2013.01)

(58) Field of Classification Search
CPC ....... G05F 21/53; G05F 21/554; G05F 21/566
See application file for complete search history.

(56) References Cited

U.S. PATENT DOCUMENTS

| 8,352,941 | B1 | 1/2013 | Protopopov et al. | |
|---|---|---|---|---|
| 8,805,951 | B1 | 8/2014 | Faibish et al. | |
| 10,409,995 | B1 | 9/2019 | Wasiq et al. | |
| 2011/0078650 | A1 | 3/2011 | Weber et al. | |
| 2013/0340077 | A1* | 12/2013 | Salsamendi | G06F 21/56 726/23 |
| 2014/0115578 | A1 | 4/2014 | Cooper et al. | |
| 2016/0063243 | A1* | 3/2016 | Sridhara | H04L 63/1425 726/23 |
| 2016/0373481 | A1 | 12/2016 | Sultan et al. | |

OTHER PUBLICATIONS

U.S. Appl. No. 16/193,842, Final Rejection, dated Oct. 7, 2020, 14 pgs.
U.S. Appl. No. 16/193,842, Non-Final Rejection, dated Jul. 9, 2020, 11 pgs.

\* cited by examiner

*Primary Examiner* — Jeffrey C Pwu
*Assistant Examiner* — Thong P Truong
(74) *Attorney, Agent, or Firm* — Kwan & Olynick LLP

(57) ABSTRACT

Computer programming code may be executed via look ahead execution in a virtual machine. The computer programming code may include a first instruction to retrieve data stored in an on-demand computing services environment and a second instruction to transmit the data to a recipient. The first instruction, the second instruction, and the data may be evaluated to determine whether the execution of the computer programming code constitutes acceptable use of the on-demand computing services environment. When it is determined that the execution of the computer programming code does not constitute acceptable use of the on-demand computing services environment, further execution of the computer programming code may be halted.

19 Claims, 7 Drawing Sheets

DISTRIBUTED SECURITY INTROSPECTION

FIELD OF TECHNOLOGY

This patent document relates generally to application security evaluation and more specifically to distributed techniques for profiling external applications executed in an on-demand computing services environment.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Many cloud computing environments execute applications written by other entities. For example, such applications may be written by customers of the cloud computing environment or by third party entities writing such applications for customers. Security is of paramount importance in many cloud computing environments. However, conventional techniques do not secure cloud computing environments against the exposure of private data or other deleterious consequences of malicious or defective external applications.

BRIEF DESCRIPTION OF THE DRAWINGS

The included drawings are for illustrative purposes and serve only to provide examples of possible structures and operations for the disclosed inventive systems, apparatus, methods and computer program products for the security evaluation of external applications. These drawings in no way limit any changes in form and detail that may be made by one skilled in the art without departing from the spirit and scope of the disclosed implementations.

DETAILED DESCRIPTION

Figure 1:
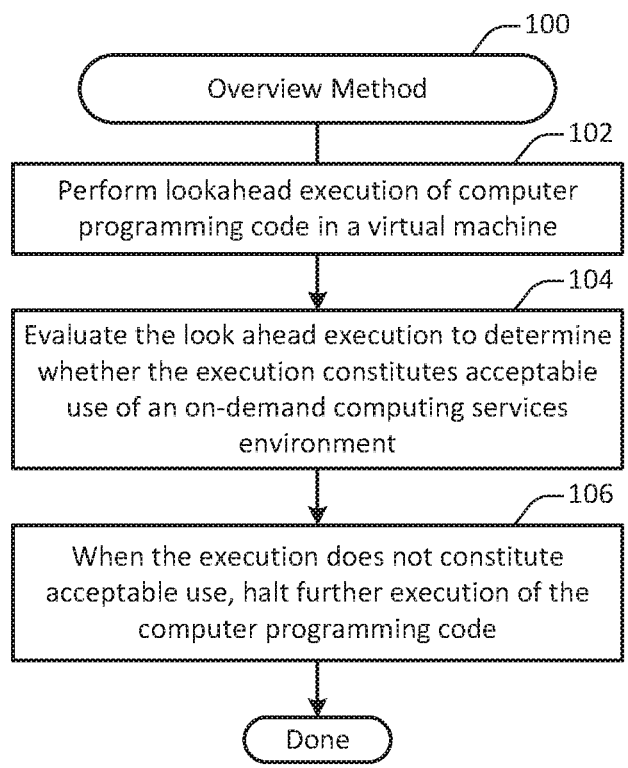
FIG. 1 illustrates an example of an overview method, performed in accordance with one or more embodiments.

Cloud providers operate application exchanges/stores for customers to download and execute their software either on a customer-owned device or in the "cloud" in a shared security model. However, customers expect that software that is deployed in the "cloud" in a server-less oriented architecture should be secure when running the package in their own cloud instance of the environment, regardless if the package was created by the service provider or third-party. As more cloud providers move to offer serverless-oriented services, improved techniques are desired for keeping keep customer and service provider data and intellectual property safe & secure.

According to various embodiments, techniques and mechanisms described herein provide for the dynamic detection of malicious or erroneous computer programming code in an on-demand computing services environment. For example, in the on-demand computing service environment, malicious code that is not caught may harvest user data without adequate user consent and exploit that data directly or transmit it to a remote location for exploitation in the future. Such problems are particularly prevalent in application exchange systems in which third-parties can supply software for customers of an on-demand computing service environment to execute in the on-demand computing service environment. However, according to techniques and mechanisms described herein, such problems may be detected in real-time or near-real time, and their consequences averted.

According to various embodiments, the system may dynamically perform process code introspection on a virtual machine in order to gain telemetry and function hooks that can be used to detect and mitigate information disclosure, unsafe function calls, and security events as code is executing on the virtual machine. For example, the system may trace function execution in real time on the virtual machine while forwarding the execution events to a scoring system. The scoring system may maintain a state of function calls across different packages to determine if an instance of a package or different packages are behaving in a way that is either unfavorable for package customers or the infrastructure service provider. When a threshold is reached using machine learning, heuristics, and/or probabilistic models, the scoring system can then update a function call pattern blacklist to mitigate the potential information disclosures, unsafe function calls, or other security events, potentially in real-time or near-real time.

As an example, consider a company Acme Corp. In order to take advantage of updated data management techniques, Acme receives on-demand computing services provided by Modern Corp. Modern provides a full-featured on-demand computing services environment, including services for communication, sales lead management, customer relations management, service management, and training. For instance, Acme uses Modern services to manage information about Acme's sales leads, customers, and products. Employing these services allows Acme to focus on Acme's business rather than on maintaining and developing computing infrastructure.

As part of Modern's system, clients may run applications to perform operations related to data stored by Modern. For example, Acme runs applications to analyze sales leads, supplement incomplete data records, automatically communicate with customers, and perform other such operations. Although Modern supplies some such applications, Modern's clients may also employ their own customized applications, which may be written by Modern's clients or by third-party application developers.

Acme employs its own application developers to develop a Modern application to communicate with customers. In the past, Acme's customer communication application has performed flawlessly, sending a few hundred customer messages per day. However, in the most recent version, Acme's developers introduced an error causing the application to inadvertently transmit unwanted communications to all of Acme's customers at once.

Acme also purchases an application from a third-party developer Fishy Corp. to supplement missing data in client records. In the past, Fishy's application has retrieved a small amount of Acme's data, used the retrieved data to identify missing information such as customer contact data, and then updated Acme's data with the identified information. However, Fishy recently updated the application to include computer programming code that may appear to be innocuous upon inspection but that actually maliciously retrieves all of Acme's customer records and sends them to an external server for exploitation.

Although Modern has many in place many security precautions, it does not manually check each and every line of code submitted in a third-party or client-supplied application. Moreover, manual inspection may fail to detect computer programming code errors or (potentially obfuscated) malicious computer programming code. Accordingly, conventional techniques may fail to prevent the transmission of the unwanted communications caused by Acme's error as well as the unauthorized retrieval and exploitation of data caused by Fishy's malicious computer programming code.

According to various embodiments, techniques and mechanisms described herein may facilitate the detection of erroneous and/or malicious computer programming code. For example, an application may be executed via look ahead execution in a virtual machine. When computer programming code is executed via look ahead execution, instructions that do not cause changes outside the virtual machine may be executed immediately. For example, data may be immediately retrieved from external locations or from within the on-demand computing service environment. As another example, data may be immediately analyzed within the virtual machine during look ahead execution. However, when computer programming code is executed via look ahead execution, instructions that do cause changes outside the virtual machine may be delayed and evaluated prior to execution. For example, requests to transmit data to remote locations or update data within the on-demand computing service environment may be delayed during look ahead execution.

According to various embodiments, information related to delayed instructions may be evaluated determine whether the execution of the instructions is permissible. Such a determination may be made based on any suitable criteria, such as predefined rules, the past behavior of the application, or the past behavior of other applications. For example, an application that retrieves, edits, or sends an excessive amount of data or unexpected types of data as compared to similar applications or previous versions of the same application may be scored as potentially impermissible. Then, such operations may be halted before data is updated within the on-demand computing service environment or transmitted outside the on-demand computing service environment.

In the example discussed above, the behavior of Acme's updated application would not have matched the behavior of previous versions, which the scoring system would flag as potentially impermissible. Similarly, in the example discussed above, the updated version of Fishy's application would be flagged as potentially impermissible based on retrieving a greater quantity of information and more types of information than previous versions of the application. Accordingly, both the unwanted communications caused by Acme's error and the exploitation of data caused by Fishy's code would be averted.

FIG. 1 illustrates an example of an overview method 100, performed in accordance with one or more embodiments. According to various embodiments, the method 100 may be performed at one or more components within an on-demand service environment such as the environments discussed with respect to FIGS. 2, 3, 4A, and 4B.

At 102, look ahead execution of computer programming code is performed in a virtual machine. According to various embodiments, a virtual machine may execute computer programming code in an on-demand service environment. The computer programming code may be authored by an entity outside the on-demand computing service environment. For example, the computer programming code may be authored by a customer of the on-demand computing service environment. As another example, the computer programming code may be authored by a third-party developer providing code for use by a customer of the on-demand computing service environment.

In some embodiments, the look ahead execution may allow the virtual machine to execute computer programming code within a virtual environment before one or more of the consequences of the execution affect that actual environment outside the virtual environment. For example, a portion of computer programming code may retrieve information from a database within the on-demand computing service environment and then transmit that information to a destination. In this case, the information may be retrieved as requested, but the transmission of the information may be delayed to allow time to evaluate whether the retrieval and transmission are permissible.

As another example, a portion of the computer programming code may receive information from a remote location and store the information to a database within the on-demand computing service environment. In this case, the information may be received as requested, but the storage of the information to the database may be delayed to allow time to evaluate whether the receiving and storing of the information are permissible. Additional details regarding look ahead execution are discussed elsewhere herein, such as with respect to the method 500 shown in FIG. 5.

At 104, the look ahead execution is evaluated to determine whether the execution of the computer programming code constitutes acceptable use of the on-demand computing services environment. According to various embodiments, the look ahead execution may be evaluated at least in part by a scoring engine outside the virtual machine. Alternately, or additionally, the look ahead execution may be evaluated at least in part by a module located within the virtual machine, such as a module located in kernel space rather than user space.

In some implementations, the look ahead execution may be evaluated to determine if the executed operations fall within acceptable boundaries. For example, if the executed operations unexpectedly retrieve an excessive amount of data or perform an excessive number of data update operations, then the look ahead execution may be deemed unacceptable. Additional details regarding the evaluation of look ahead execution are discussed elsewhere herein, such as with respect to the method 600 shown in FIG. 6.

At 106, when the execution does not constitute acceptable use, further execution of the computer programming code is halted. In some embodiments, halting the further execution of the computer programming code may involve failing to execute one or more instructions that have not yet been executed in the virtual machine. Alternately, or additionally, halting the further execution of the computer programming code may involve failing to execute one or more instructions that have been executed in the virtual machine but have not yet been executed in the environment outside the virtual machine.

In some implementations, halting further execution of the computer programming code may involve transmitting a notification message. For example, an email message or other communication may be sent to the customer associated with the instance of the computer programming code. As another example, a system administrator may be notified.

In some embodiments, halting further execution of the computer programming code may involve any of a variety of operations for preventing harm. These may include, but are not limited to: disabling the application in an application exchange, uninstalling the application from virtual machine instances or other contexts, alerting customers who may have been affected by the problem, and/or blocking access to the application. Additional details regarding the halting of the computer programming code are discussed elsewhere herein, such as with respect to the method 500 shown in FIG. 5.

Figure 2:
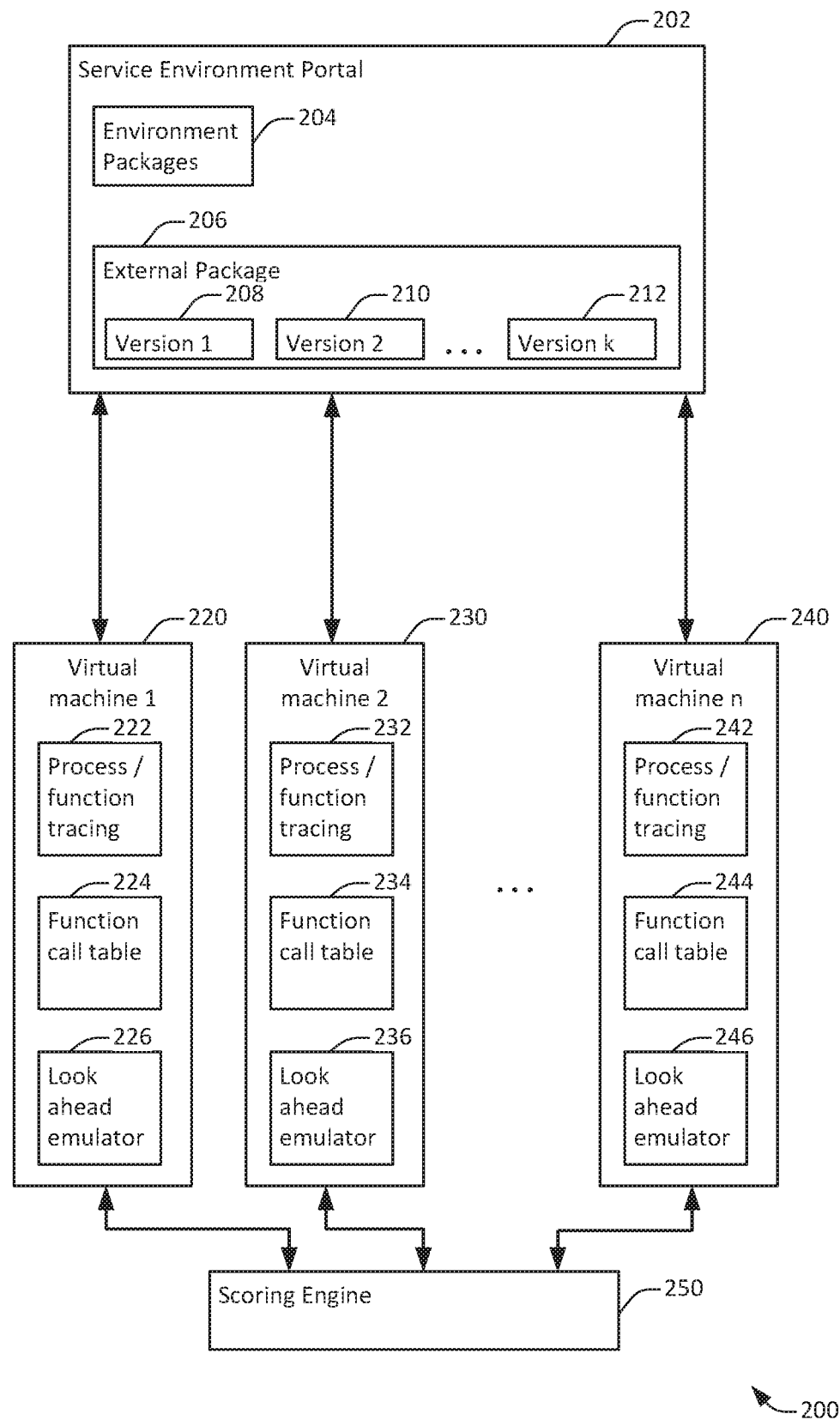
FIG. 2 illustrates an example of a system architecture, configured in accordance with one or more embodiments.

FIG. 2 illustrates an example of a system architecture 200, configured in accordance with one or more embodiments. According to various embodiments, the system architecture 200 may be employed to perform some or all of the operations discussed herein, including those discussed with respect to FIGS. 1, 5, and 6. The system architecture 200 may be composed of one or more components within an on-demand computing service environment. Additional details about on-demand computing service environments are discussed with respect to the architectures shown in FIGS. 3, 4A, and 4B.

The system architecture 200 includes a service environment portal 202, which includes environment packages 204 and an external package 206. In some embodiments, the environment packages 204 may include any computer programming code provided by the on-demand service provider. For example, 204 environment packages 204 may include standard classes, functions, or APIs for interacting with the service environment. As another example, the environment packages 204 may include computer programming code that embodies business logic for commonly encountered situations. B According to various embodiments, the service environment portal 202 provides an interface through which clients may interact with the on-demand computing service environment. For example, a client may communicate with the service environment portal 202 to instantiate one or more copies of an application to run within a virtual machine within the on-demand computing service environment. Such an application may be used to analyze, update, and/or retrieve data stored within the on-demand computing service environment.

The environment packages 204 are authored by the service provider 204 and therefore highly unlikely to contain malicious computer programming code. Accordingly, in particular embodiments the execution of the environment packages 204 need not be evaluated via lookahead execution and process/function tracing. However, the environment packages 204 may nevertheless contain errors that cause the code to perform unexpectedly. Accordingly, in some implementations the execution of one or more of the environment packages 204 may be dynamically evaluated.

The external package 206 is authored by an entity outside the on-demand computing service environment and not under the direct control of the computing environment service provider. For example, the external package 206 may be authored by a client of the on-demand computing service environment. Alternately, the external package 206 may be authored by a third-party developer and provided to the client for the client's use. Such a third-party developer may provide computer programming code directly to a client or may provide computer programming code to multiple clients through an application exchange. Although only one third-party package is shown in FIG. 2, a service environment portal may contain any number of (and potentially man) external packages.

The external package 206 includes multiple versions, including the versions 208, 210, and 212. According to various embodiments, a version may be a successive updating of the external package 206, for instance to add new features or eliminate errors in the computer programming code. Alternately, or additionally, a version may be a customized edition of the external package 206. Each version may be provided by the developer of the external package. Accordingly, a malicious developer may insert malicious computer programming code into a version of the external package 206 even if the malicious computer programming code was not present in a different or previous version. Similarly, one version of the external package 206 may include erroneous or buggy code, while another version may not.

The system architecture 200 also includes virtual machines 220, 230, and 240. According to various embodiments, each virtual machine may be configured to execute computer programming code in associate with a client of the on-demand computing service environment. For example, a client may instantiate one or more applications, which may be run in one or more virtual machines. A virtual machine may be configured as an application server, such as the application server 350 discussed with respect to FIG. 3.

Each virtual machine includes a process/function tracing module such as the modules 222, 232, and 242. According to various embodiments, a process/function tracing module is configured to facilitate look ahead execution of computer programming code. For example, a process/function tracing module may identify upcoming instructions in computer programming code that have not yet been executed but are likely to be executed in the future.

In some embodiments, the process/function tracing module may identify upcoming instructions by tracing process execution and function calls. For example, computer code may branch in execution due to "if" statements, "switch" statements, "for" loops, "while" loops, and other such control commands. The process/function tracing module may use data values stored in memory to predict which branch of such control commands may be followed. Alternately, the process/function tracing module may follow more than one potential branch of code, particularly if data stored in memory does not permit deterministic or sufficiently accurate probabilistic prediction of branching execution.

As another example, computer code drawn from one class or file may import computer code drawn from another class or file by way of function calls. The process/function tracing module may perform such importing in advance by analyzing a function call before it is executed to identify operations performed by the imported code.

According to various embodiments, the process/function tracing module may use techniques such as branch prediction and function tracing to identify operations that are likely to be performed in the future by the computer programming code. These operations may then be used to evaluate whether the computer programming code is likely to perform operations that are not permitted.

Each virtual machine includes a function call table such as the function call tables 224, 234, and 244. In some embodiments, the function call tables may maintain records of actual or predicted function calls performed by the application or applications running within the virtual machines. Each entry in the function call table may identify a function called by an application. The function call table may also include information about the parameter values passed to the function.

In particular embodiments, the function call table may be used to determine the actual function called in a dynamic dispatch or run-time method binding scenario. For instance, in some computer programming code the function being called is determined dynamically at runtime based on information determined during the execution of the code. The function call table may contain the addresses of an object's dynamically bound methods. As discussed with respect to the process/function tracing module, such information may be dynamically determined in advance of its execution via process tracing and/or function tracing. Such information may then be stored in the function call table.

Each virtual machine includes a look ahead emulator such as the emulators 226, 236, and 246. According to various embodiments, the look ahead emulator may be configured to emulate the execution of computer programming code in advance of actual execution. Look ahead emulation may involve executing operations via clock skewing. Under clock skewing, the virtual machine executes operations in the virtual environment in advance of when those operations take effect outside of the virtual machine. That is, the virtual machine may enforce a positive lag between the virtual environment and the external environment.

In some embodiments, the lookahead execution may involve immediately executing operations that have only local effect. For example, operations such as retrieving data from an external source or from the on-demand computing service environment do not change the external environment. As another example, operations such as analyzing data or updating values within the virtual environment similarly do not change the external environment. However, operations that have external effects may be delayed for analysis. Such operations may include, but are not limited to, those that involve transmitting data to a location outside the on-demand computing service environment and those that involve updating data stored within the on-demand computing service environment but outside the virtual environment, such as within a database.

According to various embodiments, because the virtual machine is employing clock skewing, a lag exists between encountering an operation that updates the external environment and the time at which the operation is actually executed. That time gap may then be used to determine whether the operation should actually be executed or should instead be halted. Techniques for lookahead execution are discussed in further detail with respect to FIG. 5.

The system architecture 200 also includes the scoring engine 250. According to various embodiments, the scoring engine 250 may be configured to receive and analyze information from the virtual machines during lookahead execution. The scoring engine 250 may apply one or more types of analysis to determine whether to halt the lookahead execution. Such techniques may include, but are not limited to: machine learning models, probabilistic models, predetermined rules, and heuristic rules. Techniques for evaluating information identified through lookahead execution are discussed in further detail with respect to FIG. 6.

In some embodiments, the scoring engine 250 may be implemented within a virtual machine. Alternately, or additionally, the scoring engine 250 may be implemented in a distributed fashion. For example, an on-demand computing services environment may include one, two, or potentially many scoring engines working independently or in concert to evaluate applications.

Figure 3:
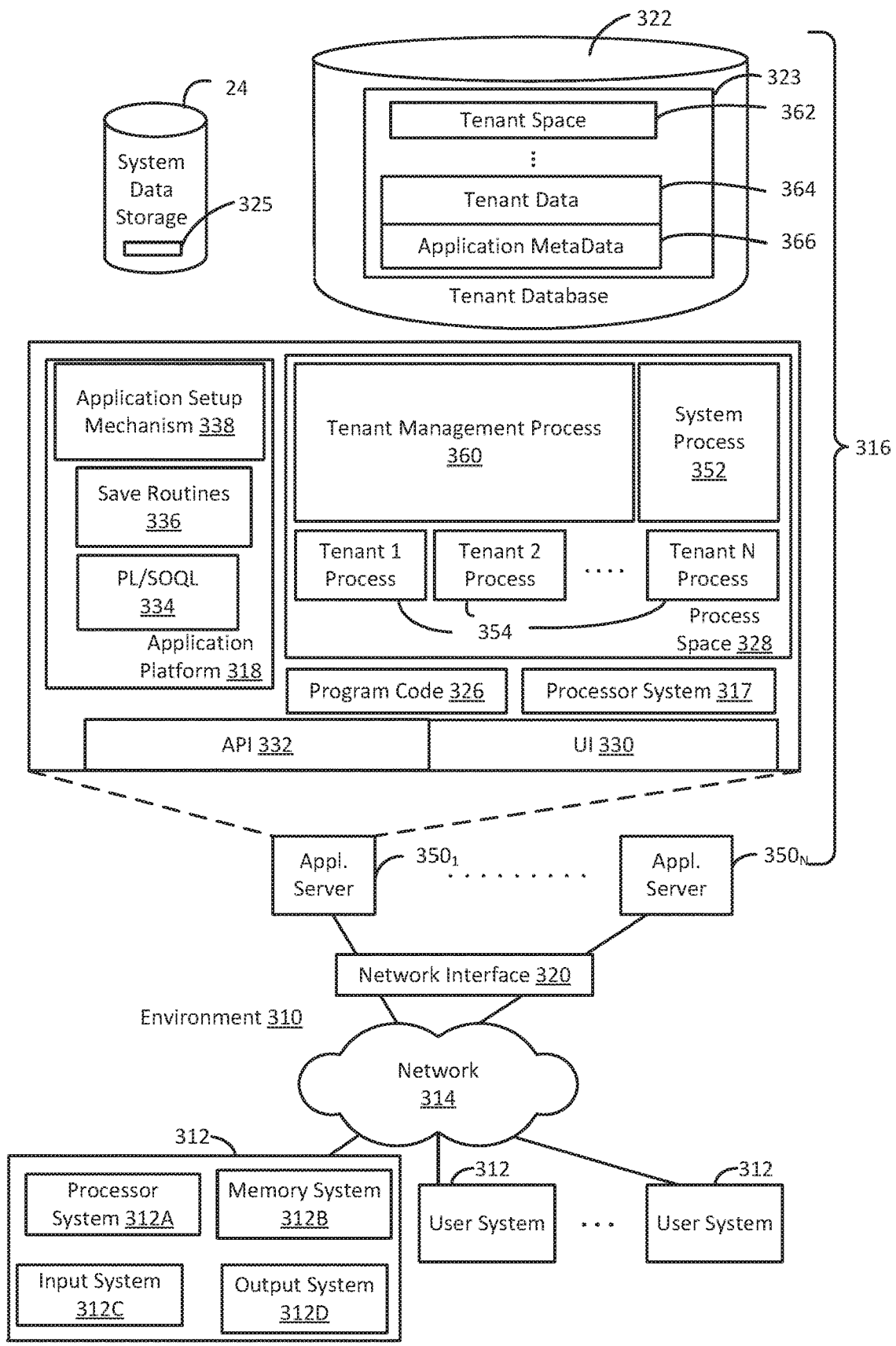
FIG. 3 shows a block diagram of an example of an environment that includes an on-demand database service configured in accordance with some implementations.

FIG. 3 shows a block diagram of an example of an environment 310 that includes an on-demand database service configured in accordance with some implementations. Environment 310 may include user systems 312, network 314, database system 316, processor system 317, application platform 318, network interface 320, tenant data storage 322, tenant data 323, system data storage 324, system data 325, program code 326, process space 328, User Interface (UI) 330, Application Program Interface (API) 332, PL/SOQL 334, save routines 336, application setup mechanism 338, application servers 350-1 through 350-N, system process space 352, tenant process spaces 354, tenant management process space 360, tenant storage space 362, user storage 364, and application metadata 366. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 316, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 316. Such applications may be developed by the database service provider or by users or third-party application developers accessing the service. Application platform 318 includes an application setup mechanism 338 that supports application developers' creation and management of applications, which may be saved as metadata into tenant data storage 322 by save routines 336 for execution by subscribers as one or more tenant process spaces 354 managed by tenant management process 360 for example. Invocations to such applications may be coded using PL/SOQL 334 that provides a programming language style interface extension to API 332. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 366 for a subscriber making such an invocation. Such system processes may also manage execution of application metadata 366 as an application in a virtual machine.

In some implementations, each application server 350 may handle requests for any user associated with any organization. A load balancing function (e.g., an F5 Big-IP load balancer) may distribute requests to the application servers 350 based on an algorithm such as least-connections, round robin, observed response time, etc. Each application server 350 may be configured to communicate with tenant data storage 322 and the tenant data 323 therein, and system data storage 324 and the system data 325 therein to serve requests of user systems 312. The tenant data 323 may be divided into individual tenant storage spaces 362, which can be either a physical arrangement and/or a logical arrangement of data. Within each tenant storage space 362, user storage 364 and application metadata 366 may be similarly allocated for each user. For example, a copy of a user's most recently used (MRU) items might be stored to user storage 364. Similarly, a copy of MRU items for an entire tenant organization may be stored to tenant storage space 362. A UI 330 provides a user interface and an API 332 provides an application programming interface to system 316 resident processes to users and/or developers at user systems 312.

System 316 may implement a web-based portal system. For example, in some implementations, system 316 may include application servers configured to implement and execute software applications in virtual machines. The application servers may be configured to provide related data, code, forms, web pages and other information to and from user systems 312. Additionally, the application servers may be configured to store information to, and retrieve information from a database system. Such information may include related data, objects, and/or Webpage content. With a multi-tenant system, data for multiple tenants may be stored in the same physical database object in tenant data storage 322, however, tenant data may be arranged in the storage medium(s) of tenant data storage 322 so that data of one tenant is kept logically separate from that of other tenants. In such a scheme, one tenant may not access another tenant's data, unless such data is expressly shared.

Several elements in the system shown in FIG. 3 include conventional, well-known elements that are explained only briefly here. For example, user system 312 may include processor system 312A, memory system 312B, input system 312C, and output system 312D. A user system 312 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 312 to access, process and view information, pages and applications available from system 316 over network 314. Network 314 may be any network or combination of networks of devices that communicate with one another, such as any one or any combination of a LAN (local area network), WAN (wide area network), wireless network, or other appropriate configuration.

The users of user systems 312 may differ in their respective capacities, and the capacity of a particular user system 312 to access information may be determined at least in part by "permissions" of the the particular user system 312. As discussed herein, permissions generally govern access to computing resources such as data objects, components, and other entities of a computing system, such as a social networking system, a CRM database system, and/or other applications running within a virtual machine. "Permission sets" generally refer to groups of permissions that may be assigned to users of such a computing environment. For instance, the assignments of users and permission sets may be stored in one or more databases of System 316. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 316 may provide on-demand database service to user systems 312 using an MTS arrangement. By way of example, one tenant organization may be a company that employs a sales force where each salesperson uses system 316 to manage their sales process. Thus, a user in such an organization may maintain contact data, leads data, customer follow-up data, performance data, goals and progress data, etc., all applicable to that user's personal sales process (e.g., in tenant data storage 322). In this arrangement, a user may manage his or her sales efforts and cycles from a variety of devices, since relevant data and applications to interact with (e.g., access, view, modify, report, transmit, calculate, etc.) such data may be maintained and accessed by any user system 312 having network access.

When implemented in an MTS arrangement, system 316 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 316 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 316 may also maintain system-level data usable by multiple tenants or other data. Such system-level data may include industry reports, news, postings, and the like that are sharable between tenant organizations.

In some implementations, user systems 312 may be client systems communicating with application servers 350 to request and update system-level and tenant-level data from system 316. By way of example, user systems 312 may send one or more queries requesting data of a database maintained in tenant data storage 322 and/or system data storage 324. An application server 350 of system 316 may automatically generate one or more SQL statements (e.g., one or more SQL queries) that are designed to access the requested data. System data storage 324 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 4A:
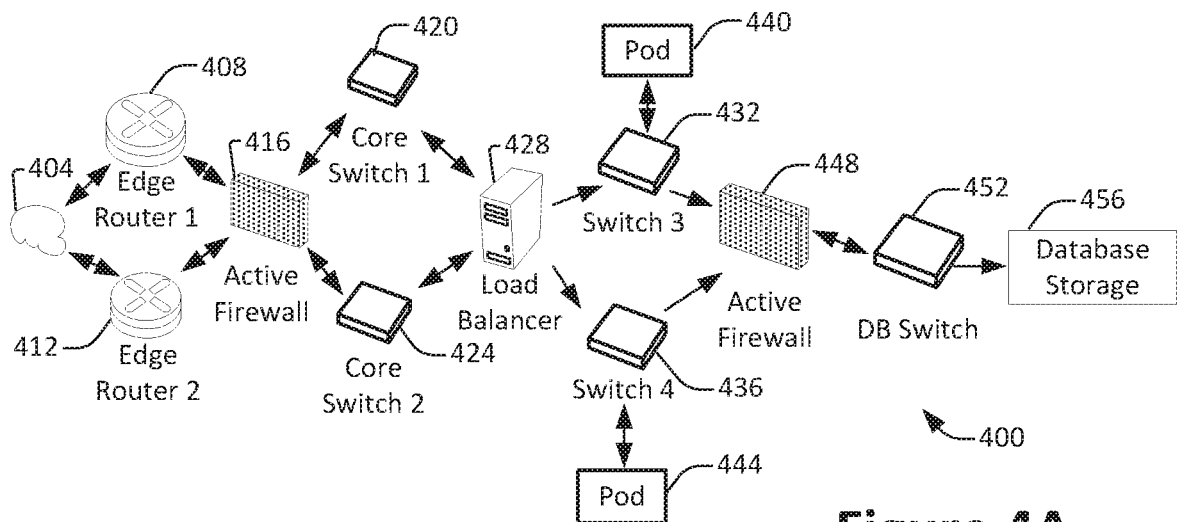
FIG. 4A shows a system diagram of an example of architectural components of an on-demand database service environment, configured in accordance with some implementations.

FIG. 4A shows a system diagram of an example of architectural components of an on-demand database service environment 400, configured in accordance with some implementations. A client machine located in the cloud 404 may communicate with the on-demand database service environment via one or more edge routers 408 and 412. A client machine may include any of the examples of user systems ?12 described above. The edge routers 408 and 412 may communicate with one or more core switches 420 and 424 via firewall 416. The core switches may communicate with a load balancer 428, which may distribute server load over different pods, such as the pods 440 and 444 by communication via pod switches 432 and 436. The pods 440 and 444, which may each include one or more servers and/or other computing resources, may perform data processing and other operations used to provide on-demand services. Components of the environment may communicate with a database storage 456 via a database firewall 448 and a database switch 452.

Accessing an on-demand database service environment may involve communications transmitted among a variety of different components. The environment 400 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 4A and 4B.

The cloud 404 refers to any suitable data network or combination of data networks, which may include the Internet. Client machines located in the cloud 404 may communicate with the on-demand database service environment 400 to access services provided by the on-demand database service environment 400. By way of example, client machines may access the on-demand database service environment 400 to retrieve, store, edit, and/or process various types of information.

In some implementations, the edge routers 408 and 412 route packets between the cloud 404 and other components of the on-demand database service environment 400. The edge routers 408 and 412 may employ the Border Gateway Protocol (BGP). The edge routers 408 and 412 may maintain a table of IP networks or 'prefixes', which designate network reachability among autonomous systems on the internet.

In one or more implementations, the firewall 416 may protect the inner components of the environment 400 from internet traffic. The firewall 416 may block, permit, or deny access to the inner components of the on-demand database service environment 400 based upon a set of rules and/or other criteria. The firewall 416 may act as one or more of a packet filter, an application gateway, a stateful filter, a proxy server, or any other type of firewall.

In some implementations, the core switches 420 and 424 may be high-capacity switches that transfer packets within the environment 400. The core switches 420 and 424 may be configured as network bridges that quickly route data between different components within the on-demand database service environment. The use of two or more core switches 420 and 424 may provide redundancy and/or reduced latency.

In some implementations, communication between the pods 440 and 444 may be conducted via the pod switches 432 and 436. The pod switches 432 and 436 may facilitate communication between the pods 440 and 444 and client machines, for example via core switches 420 and 424. Also or alternatively, the pod switches 432 and 436 may facilitate communication between the pods 440 and 444 and the database storage 456. The load balancer 428 may distribute workload between the pods, which may assist in improving the use of resources, increasing throughput, reducing response times, and/or reducing overhead. The load balancer 428 may include multilayer switches to analyze and forward traffic.

In some implementations, access to the database storage 456 may be guarded by a database firewall 448, which may act as a computer application firewall operating at the database application layer of a protocol stack. The database firewall 448 may protect the database storage 456 from application attacks such as structure query language (SQL) injection, database rootkits, and unauthorized information disclosure. The database firewall 448 may include a host using one or more forms of reverse proxy services to proxy traffic before passing it to a gateway router and/or may inspect the contents of database traffic and block certain content or database requests. The database firewall 448 may work on the SQL application level atop the TCP/IP stack, managing applications' connection to the database or SQL management interfaces as well as intercepting and enforcing packets traveling to or from a database network or application interface.

In some implementations, the database storage 456 may be an on-demand database system shared by many different organizations. The on-demand database service may employ a single-tenant approach, a multi-tenant approach, a virtualized approach, or any other type of database approach. Communication with the database storage 456 may be conducted via the database switch 452. The database storage 456 may include various software components for handling database queries. Accordingly, the database switch 452 may direct database queries transmitted by other components of the environment (e.g., the pods 440 and 444) to the correct components within the database storage 456.

Figure 4B:
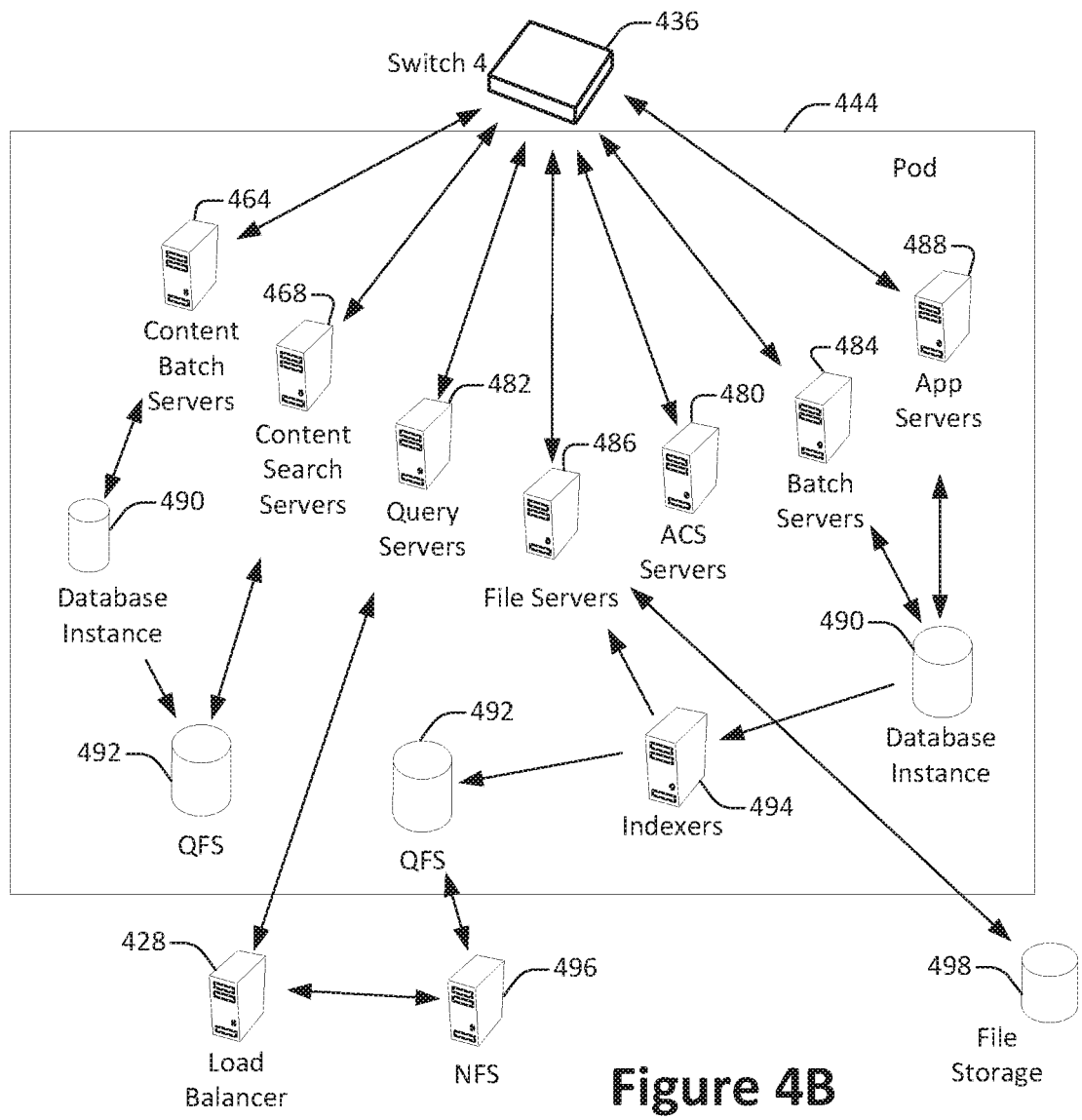
FIG. 4B shows a system diagram further illustrating an example of architectural components of an on-demand database service environment, in accordance with some implementations.

FIG. 4B shows a system diagram further illustrating an example of architectural components of an on-demand database service environment, in accordance with some implementations. The pod 444 may be used to render services to user(s) of the on-demand database service environment 400. The pod 444 may include one or more content batch servers 464, content search servers 468, query servers 482, file servers 486, access control system (ACS) servers 480, batch servers 484, and app servers 488. Also, the pod 444 may include database instances 490, quick file systems (QFS) 492, and indexers 494. Some or all communication between the servers in the pod 444 may be transmitted via the switch 436.

In some implementations, the app servers 488 may include a framework dedicated to the execution of procedures (e.g., programs, routines, scripts) for supporting the construction of applications provided by the on-demand database service environment 400 via the pod 444. One or more instances of the app server 488 may be configured to execute all or a portion of the operations of the services described herein.

In some implementations, as discussed above, the pod 444 may include one or more database instances 490. A database instance 490 may be configured as an MTS in which different organizations share access to the same database, using the techniques described above. Database information may be transmitted to the indexer 494, which may provide an index of information available in the database 490 to file servers 486. The QFS 492 or other suitable filesystem may serve as a rapid-access file system for storing and accessing information available within the pod 444. The QFS 492 may support volume management capabilities, allowing many disks to be grouped together into a file system. The QFS 492 may communicate with the database instances 490, content search servers 468 and/or indexers 494 to identify, retrieve, move, and/or update data stored in the network file systems (NFS) 496 and/or other storage systems.

In some implementations, one or more query servers 482 may communicate with the NFS 496 to retrieve and/or update information stored outside of the pod 444. The NFS 496 may allow servers located in the pod 444 to access information over a network in a manner similar to how local storage is accessed. Queries from the query servers 422 may be transmitted to the NFS 496 via the load balancer 428, which may distribute resource requests over various resources available in the on-demand database service environment 400. The NFS 496 may also communicate with the QFS 492 to update the information stored on the NFS 496 and/or to provide information to the QFS 492 for use by servers located within the pod 444.

In some implementations, the content batch servers 464 may handle requests internal to the pod 444. These requests may be long-running and/or not tied to a particular customer, such as requests related to log mining, cleanup work, and maintenance tasks. The content search servers 468 may provide query and indexer functions such as functions allowing users to search through content stored in the on-demand database service environment 400. The file servers 486 may manage requests for information stored in the file storage 498, which may store information such as documents, images, basic large objects (BLOBs), etc. The query servers 482 may be used to retrieve information from one or more file systems. For example, the query system 482 may receive requests for information from the app servers 488 and then transmit information queries to the NFS 496 located outside the pod 444. The ACS servers 480 may control access to data, hardware resources, or software resources called upon to render services provided by the pod 444. The batch servers 484 may process batch jobs, which are used to run tasks at specified times. Thus, the batch servers 484 may transmit instructions to other servers, such as the app servers 488, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 5:
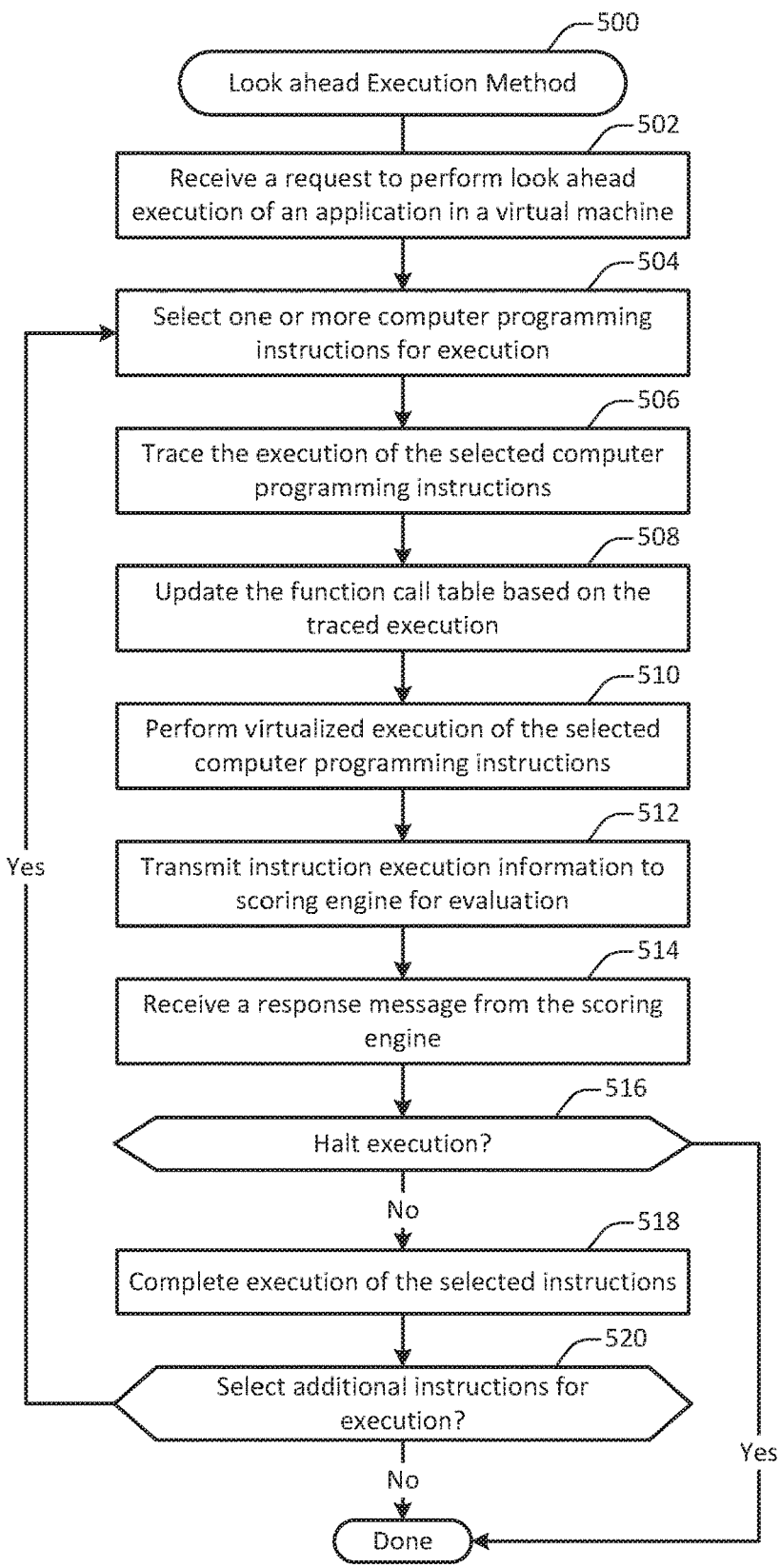
FIG. 5 illustrates an example of a method for look ahead execution, performed in accordance with one or more embodiments.

FIG. 5 illustrates an example of a method 500 for look ahead execution, performed in accordance with one or more embodiments. The method 500 may be performed at a virtual machine in communication with a service environment portal and a scoring engine. For instance, the method 500 may be performed at the virtual machine 1 220 shown in FIG. 2.

A request is received at 502 to perform look ahead execution of an instance of an application in a virtual machine. According to various embodiments, the request may be generated automatically. For instance, an instance of an application may be created at scheduled times or when one or more conditions are met. Alternately, the request may be generated manually. For instance, a user may transmit a request to create an instance of an application.

In particular embodiments, as part of the generation of the request, the system may determine whether to perform lookahead execution. Such a determination may be made based on any of a variety of criteria. For example, application instances may be selected at random to facilitate probabilistic evaluation. As another example, applications authored by untrusted or less trusted application developers may be selected. As yet another example, applications with a limited history of past execution may be selected. As yet another example, applications associated with code that has been analyzed manually or in a static manner and flagged as potentially problematic may be selected.

One or more programming instructions are selected for execution at 504. According to various embodiments, when executing an instance of an application, an existing virtual machine may be used or a new virtual machine may be created. computing programming code may then be retrieved and loaded onto the virtual machine. For example, the computing programming code may be retrieved from an application exchange storage location. As another example, the computing programming code may be retrieved from a remote storage location external to the on-demand computing services environment.

In particular embodiments, the system may select a designated number of computing programming code instructions for lookahead evaluation. For example, the system may predict flow control branches and/or trace function calls in a sequence of computing programming code instructions to identify computing programming code instructions to select.

The execution of the selected computing programming code instructions is traced at 506. According to various embodiments, the selected computing programming code instructions may be traced by performing such prediction processes as loop unrolling, branch prediction, and function call tracing. For example, data in memory may be used to determine or predict the output of Boolean operations used to determine control code branching. As another example, data in memory may be used to determine or predict function identity for functions determined dynamically at runtime. As part of such predictions and tracing, the system may predict and collect the computing programming code instructions likely to be executed in the near future, which may provide the basis of the instructions selected at 504 during a subsequent iteration of the procedure.

The function call table is updated at 508. According to various embodiments, the function call table may be updated using information determined at operation 506. For example, the function call table may be updated to include function calls included in the selected computing programming code instructions. As another example, the function call table may be updated to include future function calls predicted via function tracing.

Virtualized execution of the one or more computing programming code instructions is performed at 510. In some embodiments, virtualized execution may involve executing operations that do not have external consequences. For instance, data may be retrieved from within the on-demand computing services environment and/or analyzed within the virtual machine.

In some implementations, virtualized execution may involve predicting the execution of operations that do have external consequences. For example, messages transmitting data to locations outside the on-demand computing services environment may be prepared but not sent. As another example, database update requests may be prepared but not actually executed.

Instruction execution information is transmitted to the scoring engine at 512. According to various embodiments, the instruction execution information may include any information suitable for use by the scoring engine for making a determination as to the permissibility of executing the selected instructions. The instruction information may include, but is not limited to: the computer programming instructions themselves, state information describing the memory content associated with the application instance, information derived from tracing the execution of the computer programming code instructions, computing programming code instructions predicted for execution in the future, function call tracing information, output information from the virtualized execution, or any other suitable information.

A response message is received from the scoring engine at 514. According to various embodiments, the response message may include information indicating whether the look ahead execution of the selected computing programming code instructions should halt or proceed. Using this information, a determination is made at 516 as to whether to halt execution.

According to various embodiments, halting execution of the application may involve terminating the application. Then, information describing the reason that execution was halted may be stored for further analysis. For example, the virtual machine state may be frozen for inspection by administrative personnel. As another example, the client may be notified that the application instance was halted.

If execution is not halted, then the execution of the selected instructions is completed at 518. According to various embodiments, the execution of the selected instructions may be completed by executing any operations delayed due to having an external effect. For example, operations such as database update requests and messages transmitted to destinations outside the on-demand computing services environment may be performed.

A determination is made at 520 as to whether to select additional instructions for execution. According to various embodiments, additional instructions are selected so long as the application has not yet terminated and execution has not yet halted.

Figure 6:
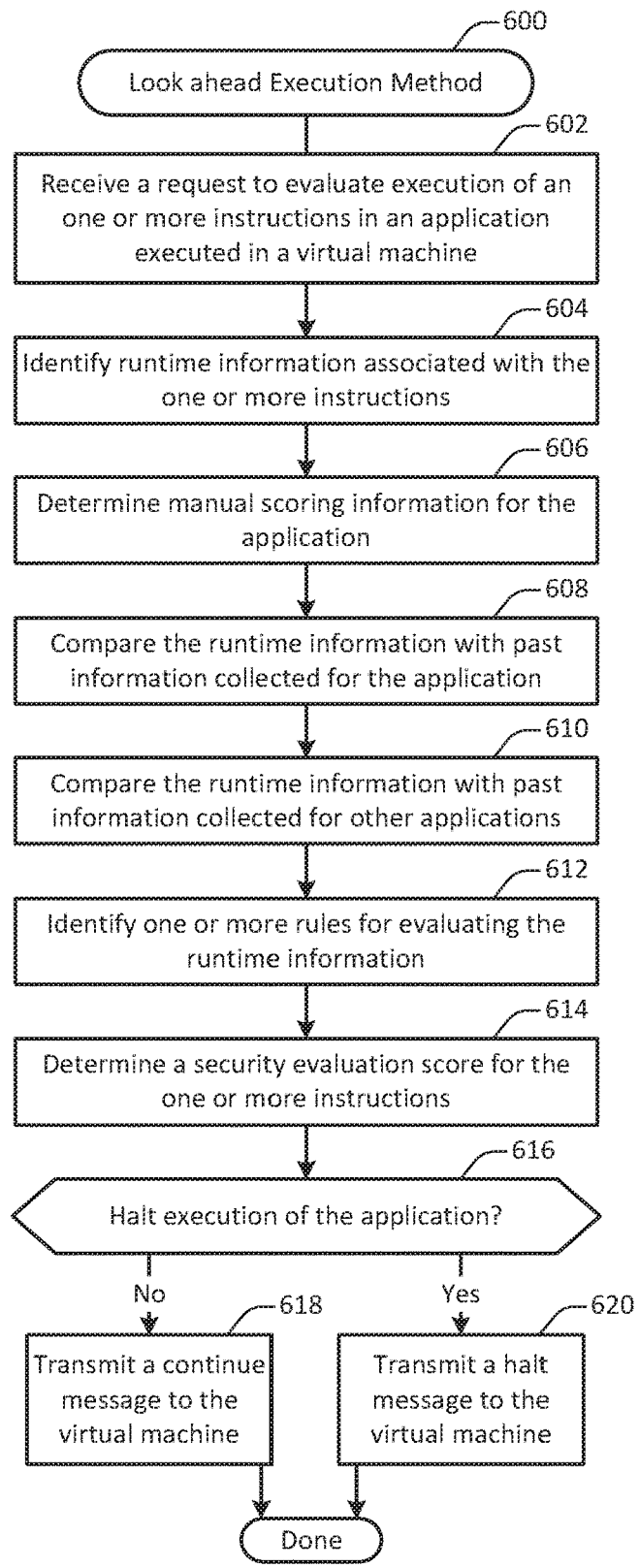
FIG. 6 illustrates an example of a method for look ahead evaluation, performed in accordance with one or more embodiments.

FIG. 6 illustrates an example of a method 600 for look ahead evaluation, performed in accordance with one or more embodiments. According to various embodiments, the method 600 may be performed at a computing device within an on-demand computing services environment. For example, the method 600 may be performed at the scoring engine 250 shown in FIG. 2. The method 600 may be performed when the scoring engine receives a request to evaluate the execution of an application.

A request to evaluate the execution of one or more instructions in an application executed in a virtual machine is received at operation 602. The request may be generated by a virtual machine executing such an application via lookahead execution, for instance as discussed with respect to the method 500 shown in FIG. 5. For example, the request may be generated as part of the transmission of instruction execution information discussed with respect to operation 512 in FIG. 5.

Runtime information associated with the one or more instructions is identified at 604. According to various embodiments, the runtime information may include any information related to the execution of the one or more instructions. For example, the information may include computer programming code executed before, during, or after the scheduled execution of the instructions. As another example, the information may include data related to the execution of the instructions, such as data retrieved by the instructions, data processed by the instructions, or data generated by the execution of the instructions.

In some implementations, the runtime information may include data characterizing the execution of the instructions. For example, the information may identify characteristics of records retrieved from a database, such as the number of record rows, the number of record fields, the record or field types, or other such data. As another example, the information may identify a designated recipient or recipients of data received or processed by the instructions, such as an email address or a storage location on a remote server.

In some embodiments, the runtime information may be received from the virtual machine at which the instructions are being executed. For instance, the information may be received with the request received at 602, or may be received in a different message. Alternately, or additionally, the runtime information may be retrieved from elsewhere in the on-demand computing services environment. For example, a database management engine may transmit a message to the scoring engine that includes information about data retrieved by the instructions.

Manual scoring information for the application is determined at 606. According to various embodiments, the manual scoring information may be retrieved from a repository characterizing information provided based on manual review of the application code. For example, a human being many review an application after it is submitted to identify potential security problems. The human reviewer may assign a score indicating the likelihood of the application exhibiting problems. The manual scoring information may apply to the current version of the application and/or may apply to one or more previous version of the application.

At 608, the runtime information is compared with past information collected for the application. According to various embodiments, the comparison may involve determining whether the runtime information identified at 604 is consistent with runtime information collected about the application in the past. For example, current runtime information for the application may be compared with past runtime information for the application to determine if the current runtime behavior is unusual. Unusual runtime information may include, but is not limited to: an unusual number or type of function calls; and unusual number or type of data records retrieved; an unusual number or type of programming code classes imported; an unusual number or type of data records updated, created, or deleted; an unusual amount or type of data transmitted to a remote location; and an unusual recipient or recipients of data generated by the application.

According to various embodiments, the comparison made at operation 608 may involve determining whether the runtime information identified at 604 is consistent with manual scoring information determined in the past. For example, the runtime information may be used to construct an estimated manual security score for the application, and this score may be compared with a manual score provided by a human.

In some embodiments, the comparison made at operation 608 may involve comparing the runtime information with the output of static analytic tools. For example, a function tracing procedure may trace function calls, parameters, processed, threads, data retrieval requests, code import statements, and other such operations in the code to construct a graph of the application. The runtime information may then be compared with this graph to determine whether the function is behaving unexpectedly. Unexpected behavior may include, for example, function calls in the runtime information that are not predicted by the application graph produced by the function tracing procedure.

The runtime information is compared with past information collected for other applications at 610. In some implementations, the past information collected for other operations may include, for example, runtime information for other applications generally within the on-demand computing services environment or specifically within the same organization within the environment. For example, the programming code classes imported, the data retrieved or transmitted, and/or the function calls made by the application may be compared with similar information about other applications to determine whether the application's behavior is out of the ordinary. As with the comparison to past information, unusual runtime information may include, but is not limited to: an unusual number or type of function calls; and unusual number or type of data records retrieved; an unusual number or type of programming code classes imported; an unusual number or type of data records updated, created, or deleted; an unusual amount or type of data transmitted to a remote location; and an unusual recipient or recipients of data generated by the application.

In some implementations, the comparisons made at operations 608 and 610 may be substantially similar. Alternately, different types of comparisons may be performed. For example, when an application is compared with its own prior versions, the comparisons may involve evaluating parameter values, function calls, and imported libraries. When instead an application is compared with other applications in the same organization or on-demand service environment, the comparisons may involve baseline levels of data access and other characteristics between these applications.

One or more rules for evaluating the runtime information are determined at 612. In some implementations, the one or more rules may determine how the comparisons performed at operation 608 and 610 lead to a determination of a security evaluation score at operation 614.

According to various embodiments, rules may be determined in any of a variety of ways. For example, a user such as an administrator may specify a rule or heuristic. As another example, a machine learning algorithm may determine rules or heuristics based on information such as on behavior observed in the system. For instance, the system may observe application behavior over time and develop threshold levels of record access that constitute unacceptable use. In particular embodiments, a rule may indicate a degree of deviation from normal behavior that is acceptable before an application is halted.

In some embodiments, a variety of rules are possible. For example, a violation of explicit permissions may indicate a high probability of malicious code. As another example, a number of data read requests in excess of a designated threshold may indicate a high probability of malicious code.

At 614, a security evaluation score is determined for the one or more instructions. According to various embodiments, the security evaluation score may be produced by applying the one or more rules determined at operation 612 to the comparisons performed at operation 608 and 610. In some configurations, the security evaluation score may be implemented as a Boolean value indicating whether the application execution should be halted. Alternately, the security evaluation score may be implemented as a continuous or categorical variable. For example, the security evaluation score may be implemented as a continuous variable which would indicate that execution should be halted were the score to exceed a designated threshold. As another example, the security evaluation score may be implemented as a categorical risk factor indicating the security risk associated with the application as, for instance, "low", "medium", or "high."

In particular embodiments, the security evaluation score may be cumulative. For example, the scoring engine may maintain a running security evaluation score for an application. The score may then be updated upon the receipt of successive scoring requests. Should the score exceed a designated threshold, then execution may be halted.

A determination is made at 616 as to whether to halt the execution of the application. According to various embodiments, the determination may be made at least in part based on the security evaluation score determined at 614. For example, the security evaluation score may be compared against a designated threshold value. As another example, the security evaluation score may be implemented as a Boolean value indicating whether the application is defective or includes malicious code.

If a decision is made to halt the execution of the application, then a halt message is transmitted to the virtual machine at 620. Alternately, if a decision is made not to halt the execution of the application, then a continue message is transmitted to the virtual machine at 618.

In some implementations, one or more of the operations shown in FIG. 6 may be omitted. For example, in some configurations a message may be transmitted to the virtual machine only in the event that a halt condition is determined. As another example, one or more of the operations 606-612 may be omitted. For instance, past runtime information or manual scoring information may be unavailable for some application instances.

According to various embodiments, the method 600 may involve one or more operations not shown in FIG. 6. For example, the detection of potentially problematic code may trigger a message to a systems administrator and/or may trigger logging behavior.

Although method 600 is described as being used to detect security-related issues, a variety of other issues may be detected instead of, or in addition to, security-related issues. For example, the scoring engine may determine that an application is unexpectedly and repeatedly executing the same instructions or instructions. From this behavior, the scoring engine may determine that the application is stuck in an infinite loop and transmit an instruction to halt the application even though no security-related issues have been detected. As another example, the unexpected retrieval of a large amount of data may indicate a programming error rather than malicious code. Nevertheless, the scoring engine may halt the application upon the detection of such conditions. Other types of errors that may be detected may include, but are not limited to: race conditions, off-by-one errors, unreachable code, incorrect variable names, and other such problems.

Figure 7:
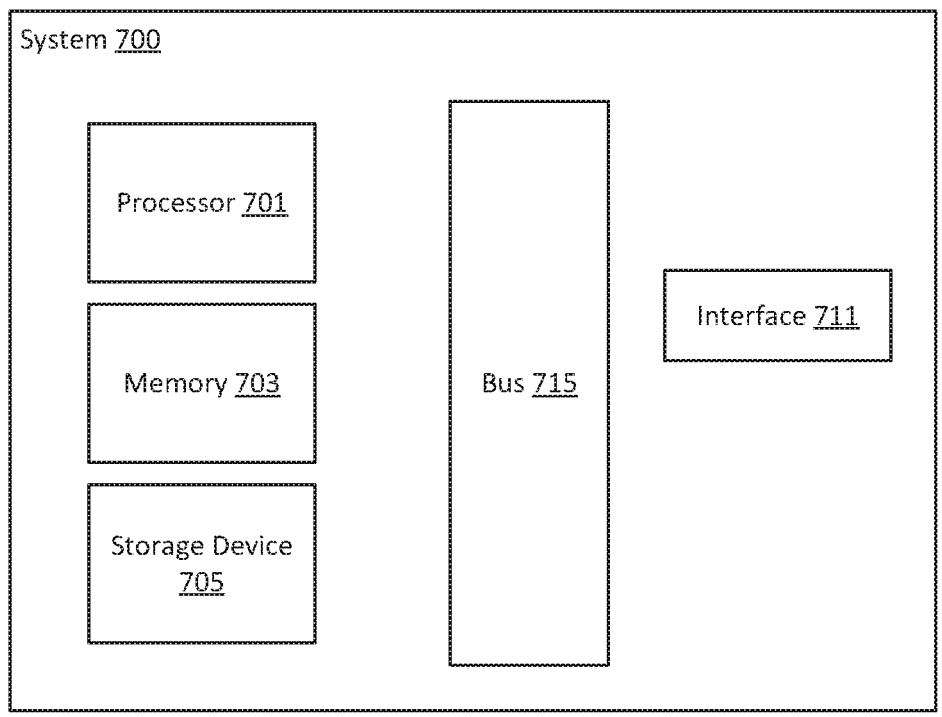
FIG. 7 illustrates an example of a server, configured in accordance with one or more embodiments.

FIG. 7 illustrates one example of a computing device. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:
performing look ahead execution of computer programming code in a virtual machine implemented on a computing device that includes a processor and memory, the computer programming code including a first instruction to retrieve data stored in an on-demand computing services environment, the computer programming code further including a second instruction to transmit the data to a recipient, the look ahead execution executing the first instruction but not the second instruction;
after executing the first instruction and retrieving the data, evaluating the first instruction, the second instruction, and the data via a processor to determine whether the execution of the computer programming code constitutes acceptable use of the on-demand computing services environment, wherein evaluating the first instruction, the second instruction, and the data further comprises receiving a response message from a scoring engine indicating whether the execution of the computer programming code constitutes acceptable use of the on-demand computing services environment; and
after determining that the execution of the computer programming code does not constitute acceptable use of the on-demand computing services environment, halting further execution of the computer programming code.

2. The method recited in claim 1, wherein evaluating the first instruction, the second instruction, and the data comprises transmitting a request message to the scoring engine via a network.

3. The method recited in claim 2, wherein the request message includes the first instruction, the second instruction, and information characterizing the data.

4. The method recited in claim 1, wherein evaluating the first instruction, the second instruction, and the data comprises making a comparison with operations performed by a prior version of the computer programming code.

5. The method recited in claim 1, wherein evaluating the first instruction, the second instruction, and the data comprises making a comparison with operations performed by a plurality of applications executed in the on-demand computing services environment.

6. The method recited in claim 1, wherein the virtual machine is instantiated at the request of a client organization accessing the on-demand computing services environment, and wherein the computer programming code is included in an application instantiated at the request of the client organization.

7. The method recited in claim 6, wherein the application is authored by the client organization.

8. The method recited in claim 6, wherein the application is authored by a third-party software developer.

9. The method recited in claim 8, wherein the application is accessed via an application exchange that provides applications for purchase and use in the on-demand computing environment.

10. The method recited in claim 1, wherein the data is retrieved from a multi-tenant database accessible via the on-demand computing services environment.

11. A computing device comprising:
a processor configurable to perform look ahead execution of computer programming code in a virtual machine, the computer programming code including a first instruction to retrieve data stored in an on-demand computing services environment, the computer programming code further including a second instruction to transmit the data to a recipient, the look ahead execution executing the first instruction but not the second instruction;
a communications interface configurable to, after executing the first instruction and retrieving the data, communicate with a scoring engine via a network to evaluate the first instruction, the second instruction, and the data to determine whether the execution of the computer programming code constitutes acceptable use of the on-demand computing services environment, wherein evaluating the first instruction, the second instruction, and the data further comprises receiving a response message from a scoring engine indicating whether the execution of the computer programming code constitutes acceptable use of the on-demand computing services environment; and
a memory module configured to store a state of the virtual machine when further execution of the computer programming code is halted after determining that the execution of the computer programming code does not constitute acceptable use of the on-demand computing services environment.

12. The computing device recited in claim 11, wherein the virtual machine is instantiated at the request of a client organization accessing the on-demand computing services environment, and wherein the computer programming code is included in an application instantiated at the request of the client organization.

13. The computing device recited in claim 12, wherein the application is authored by the client organization.

14. The computing device recited in claim 12, wherein the application is authored by a third-party software developer.

15. The computing device recited in claim 13, wherein the application is accessed via an application exchange through which applications can be purchased for use in the on-demand computing environment.

16. The computing device recited in claim 11, wherein the data is retrieved from a multi-tenant database accessible via the on-demand computing services environment.

17. One or more non-transitory computer readable media having stored thereon computer instructions capable of performing a method, the method comprising:
performing look ahead execution of computer programming code in a virtual machine implemented on a computing device that includes a processor and memory, the computer programming code including a first instruction to retrieve data stored in an on-demand computing services environment, the computer programming code further including a second instruction to transmit the data to a recipient, the look ahead execution executing the first instruction but not the second instruction;
after executing the first instruction and retrieving the data, evaluating the first instruction, the second instruction, and the data to determine whether the execution of the computer programming code constitutes acceptable use of the on-demand computing services environment, wherein evaluating the first instruction, the second instruction, and the data further comprises receiving a response message from a scoring engine indicating whether the execution of the computer programming code constitutes acceptable use of the on-demand computing services environment; and after determining that the execution of the computer programming code does not constitute acceptable use of the on-demand computing services environment, halting further execution of the computer programming code.

18. The one or more non-transitory computer readable media recited in claim 17, wherein the virtual machine is instantiated at the request of a client organization accessing the on-demand computing services environment, and wherein the computer programming code is included in an application instantiated at the request of the client organization.

19. The one or more non-transitory computer readable media recited in claim 17,
  wherein evaluating the first instruction, the second instruction, and the data comprises transmitting a request message to the scoring engine via a network, the request message including the first instruction, the second instruction, and information characterizing the data.

* * * * *